United States Patent
Valdes De La Garza et al.

(10) Patent No.: US 10,953,780 B2
(45) Date of Patent: Mar. 23, 2021

(54) DEPLOYABLE INFILL ASSEMBLY AND PASSENGER SEAT CONSTRUCTION

(71) Applicant: B/E Aerospace, Inc., Winston-Salem, NC (US)

(72) Inventors: Javier Valdes De La Garza, Winston-Salem, NC (US); Benji S. Meadows, Mt. Airy, NC (US); Ryan J. Suhre, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 92 days.

(21) Appl. No.: 16/260,207

(22) Filed: Jan. 29, 2019

(65) Prior Publication Data
US 2020/0238880 A1 Jul. 30, 2020

(51) Int. Cl.
*B60N 3/06* (2006.01)
*B64D 11/06* (2006.01)
*B60N 2/34* (2006.01)

(52) U.S. Cl.
CPC ............. *B60N 3/063* (2013.01); *B60N 2/34* (2013.01); *B64D 11/0641* (2014.12); *B64D 11/0643* (2014.12)

(58) Field of Classification Search
CPC ...... B60N 3/063; B60N 2/34; B64D 11/0641; B64D 11/0643; B64D 11/0639
USPC .................................................... 297/423.29
See application file for complete search history.

(56) References Cited

U.S. PATENT DOCUMENTS

| | | | |
|---|---|---|---|
| 2,081,529 A * | 5/1937 | Canney | B64D 11/00 244/118.6 |
| 2,174,622 A | 10/1939 | Dale | |
| D194,673 S * | 2/1963 | Watlington | D6/360 |
| 3,744,843 A | 7/1973 | Barecki et al. | |
| 3,762,764 A | 10/1973 | McJunkin | |
| 3,813,149 A | 5/1974 | Lawrence, III et al. | |
| 4,226,469 A | 10/1980 | Rogers, Jr. et al. | |
| 4,620,335 A * | 11/1986 | Dodgen | B60N 2/34 296/69 |
| 4,969,682 A * | 11/1990 | Gray | B60N 2/20 297/378.1 |
| 5,320,411 A | 6/1994 | Sera | |
| 5,695,239 A | 12/1997 | Johnson et al. | |
| 7,055,839 B2 | 6/2006 | Leitner | |
| 7,517,010 B2 | 4/2009 | Saint-Jalmes et al. | |
| 9,022,320 B2 | 5/2015 | Wallace et al. | |
| 9,102,250 B2 * | 8/2015 | Seibold | B60N 2/24 |
| 9,446,849 B1 * | 9/2016 | Pinkal | B64D 11/064 |

(Continued)

OTHER PUBLICATIONS

Search Report dated Jun. 12, 2020 for EP Application No. 19215969.

*Primary Examiner* — Mark R Wendell
(74) *Attorney, Agent, or Firm* — Suiter Swantz pc llo

(57) ABSTRACT

A deployable infill assembly and passenger seat construction. The infill assembly includes a cushion element deployable laterally along a low trajectory from a stowed position to a deployed position. The cushion assembly is coupled to a frame carrying guide tracks for guiding movement of the cushion assembly between the stowed and deployed positions. The cushion assembly is selectively deployable for use as a leg support, table or to complete a continuous bed. The infill assembly is packaged in a compact footprint well-suited for aircraft applications.

16 Claims, 7 Drawing Sheets

(56) References Cited

U.S. PATENT DOCUMENTS

| | | | | |
|---|---|---|---|---|
| 10,464,679 B2* | 11/2019 | Hoover | .................. | B64D 11/064 |
| 2004/0232283 A1* | 11/2004 | Ferry | .................... | B60N 2/3065 |
| | | | | 244/118.6 |
| 2005/0242634 A1* | 11/2005 | Serber | .................. | B60N 2/0745 |
| | | | | 297/216.1 |
| 2008/0007091 A1 | 1/2008 | Lechkun et al. | | |
| 2009/0001795 A1* | 1/2009 | Homier | .................... | B60N 2/22 |
| | | | | 297/341 |
| 2009/0166470 A1 | 7/2009 | Dryburgh et al. | | |
| 2011/0253838 A1 | 10/2011 | Bettell | | |
| 2015/0284092 A1* | 10/2015 | Wilkey | .............. | B64D 11/0643 |
| | | | | 297/423.29 |
| 2018/0155033 A1* | 6/2018 | Pacheco | ................ | B60N 2/504 |
| 2019/0152354 A1* | 5/2019 | Kapusky | .............. | B60N 2/3015 |
| 2020/0029696 A1* | 1/2020 | Romano | ................ | A61G 15/12 |

\* cited by examiner

DEPLOYABLE INFILL ASSEMBLY AND PASSENGER SEAT CONSTRUCTION

BACKGROUND

The construction of passenger seats for aircraft and other conveyances is determined according to seating class. For example, aircraft passenger cabins may be configured with one or more of economy, premium economy and business seating classes. Economy and premium economy seating classes are typically configured with rows of closely-spaced seat groupings wherein individual seats lack lower leg support and have limited seat back recline due to the relatively short seat pitch. Business seating classes may be configured with larger seats and living spaces, wherein the comparatively long seat pitch allows greater seat adjustability. In some configurations, premium seats can adjust between a seat and a bed.

Conventional lie-flat seat constructions typically include a seat back, seat bottom and leg rest that move into horizontal alignment to form the bed. In some seat constructions, the combined longitudinal length of the seat elements is less than the8 desired bed length. In other seat constructions, the seat may include an ottoman forward of the seat that meets the leg rest when the seat is fully reclined. This configuration may position the ottoman too close to the seat when upright, thereby limiting leg room and compromising a safe seat ingress and egress path to the seat.

In some configurations, it may desirable to space the ottoman far from the seat to provide additional leg room when the seat is upright or adjusted short of fully lie-flat. In such configurations, it may difficult, impractical or impossible to translate a seat element far enough to meet the spaced ottoman, leaving a gap between the ottoman and the nearest seat element and resulting in a discontinuous bed uncomfortable for sleeping.

Accordingly, it would be desirable to provide an assembly separate from the passenger seat that deploys to occupy or fill the space directly forward of a reclined seat element. Such as assembly could advantageously be used to expand the continuous seat surface or a bed. For safety reasons, it would be desirable for the assembly to stow out of the seat ingress and egress path directly forward of the passenger seat. Further, a desirable assembly would be easy to stow and deploy and would be robust to withstand a lifetime of repeated cycling. Still further, it would be desirable to package the assembly in a compact and lightweight package particularly-suited for aircraft applications.

SUMMARY OF THE INVENTIVE ASPECTS

To achieve the foregoing, the inventive aspects disclosed herein are directed to a deployable infill assembly including a frame including guide tracks, a cushion assembly coupled to the frame movable between a stowed position and a deployed position, at least one guide coupled to the cushion assembly engaged to travel within the guide tracks, and a support element coupled between the frame and the cushion assembly, the support element movable with the cushion assembly as the cushion assembly transitions between the stowed and deployed positions.

In some embodiments, the stowed position may correspond to a vertical orientation of the cushion assembly within the frame, and the deployed position may correspond to a horizontal orientation of the cushion assembly cantilevered relative to the frame.

In some embodiments, the at least one guide may be positioned on a bottom of the cushion assembly inward of an end of the cushion assembly nearest the frame when the cushion assembly is in the deployed position.

In some embodiments, the guide tracks may each include a linear portion and an arcuate portion, the linear portion guiding linear movement of the cushion assembly during initial movement of the cushion assembly away from the stowed position, and the arcuate portion guiding rotational movement of the cushion assembly as the cushion assembly nears the deployed position.

In some embodiments, the support element may be pivotally attached to each of the cushion assembly and the frame, and wherein the support element may be diagonally-oriented to support the cantilevered cushion assembly in the deployed position.

In some embodiments, the cushion assembly may include a recessed bottom portion receiving the support element therein when the cushion assembly is in the stowed position.

In some embodiments, the cushion assembly may be disposed between the spaced frame members when in the stowed position, and wherein the cushion assembly may be positioned above the spaced frame members when in the deployed position.

In some embodiments, the assembly may further include a cushion affixed atop the frame separate from the cushion assembly, and wherein the cushion and the cushion assembly reside in a same horizontal plane when the cushion assembly is in the deployed position.

In some embodiments, the assembly may further include a spring-loaded lever pivotally attached at one end to the frame, the spring-loaded lever having a free end intersecting one of the guide tracks to contact the at least one guide at a predetermined position along a length of the respective one of the guide tracks to slow movement of the cushion assembly as the guide moves toward the stowed position, and the spring-loaded lever providing an initial lifting force acting on the at least one guide during initial movement of the cushion assembly away from the stowed position.

In another aspect, the inventive concepts disclosed herein are directed to a passenger seat construction including a seat element, an ottoman positioned spaced-apart from the seat element, and a deployable infill assembly including a frame including spaced frame members and guide tracks, a cushion assembly movably coupled to the frame, at least one guide carried on the cushion assembly engaged within the guide tracks and a support element coupled between the frame and the cushion assembly, wherein the cushion assembly transitions relative to the frame between a stowed position and a deployed position, and wherein the cushion assembly deploys laterally between the seat element and the ottoman.

In some embodiments, the stowed position may correspond to a vertical orientation of the cushion assembly within the frame, and the deployed position may correspond to a horizontal orientation of the cushion assembly cantilevered relative to the frame.

In some embodiments, the seat element may be a leg rest or a seat bottom, and wherein the seat element is movable between a first position corresponding to an upright sitting position of the passenger seat, and a second position corresponding to a lounge or bed configuration of the passenger seat.

In some embodiments, the guide tracks may each include a linear portion and an arcuate portion, the linear portion guiding linear movement of the cushion assembly during initial movement of the cushion assembly away from the stowed position, and the arcuate portion guiding rotational movement of the cushion assembly as the cushion assembly nears the deployed position.

In some embodiments, the cushion assembly may include a recessed bottom portion receiving the support element therein when the cushion assembly is in the stowed position.

In some embodiments, the infill assembly may further include a cushion affixed atop the frame separate from the cushion assembly, and wherein the cushion and the cushion assembly reside in a same horizontal plane when the cushion assembly is in the deployed position.

In some embodiments, the assembly may further include a spring-loaded lever pivotally attached at one end to the frame, the spring-loaded lever having a free end intersecting one of the guide tracks to contact the at least one guide at a predetermined position along a length of the respective one of the guide tracks to slow movement of the cushion assembly as the guide moves toward the stowed position, and the spring-loaded lever providing an initial lifting force acting on the at least one guide during initial movement of the cushion assembly away from the stowed position.

In another aspect, the inventive concepts disclosed herein are directed to a premium class passenger seat construction including a peninsula-shaped seat surface including a seat element, an ottoman, and a connecting portion, wherein at least part of the connecting portion is an infill assembly comprising a cushion assembly configured to transition between a stowed position and a deployed position, wherein the stowed position corresponds to a vertical orientation of the cushion assembly and the deployed position corresponds to a horizontal orientation of the cushion assembly.

In some embodiments, the infill assembly may include a static frame including spaced frame elements and guide tracks, at least one guide coupled to the cushion element and engaged in the guide tracks, and a support element pivotally attached between the cushion element and the static frame, wherein the support element moves with the cushion assembly as the cushion assembly transitions between the stowed and deployed positions.

In some embodiments, the cushion assembly may include a recessed bottom portion receiving the support element therein when the cushion assembly is in the stowed position.

In some embodiments, the seat element may be a leg rest or a seat bottom, and wherein the seat element is movable between a first position corresponding to an upright sitting position of the passenger seat and a second position corresponding to a lounge or bed configuration of the passenger seat.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DESCRIPTION OF ILLUSTRATIVE EMBODIMENTS

Figure 1:
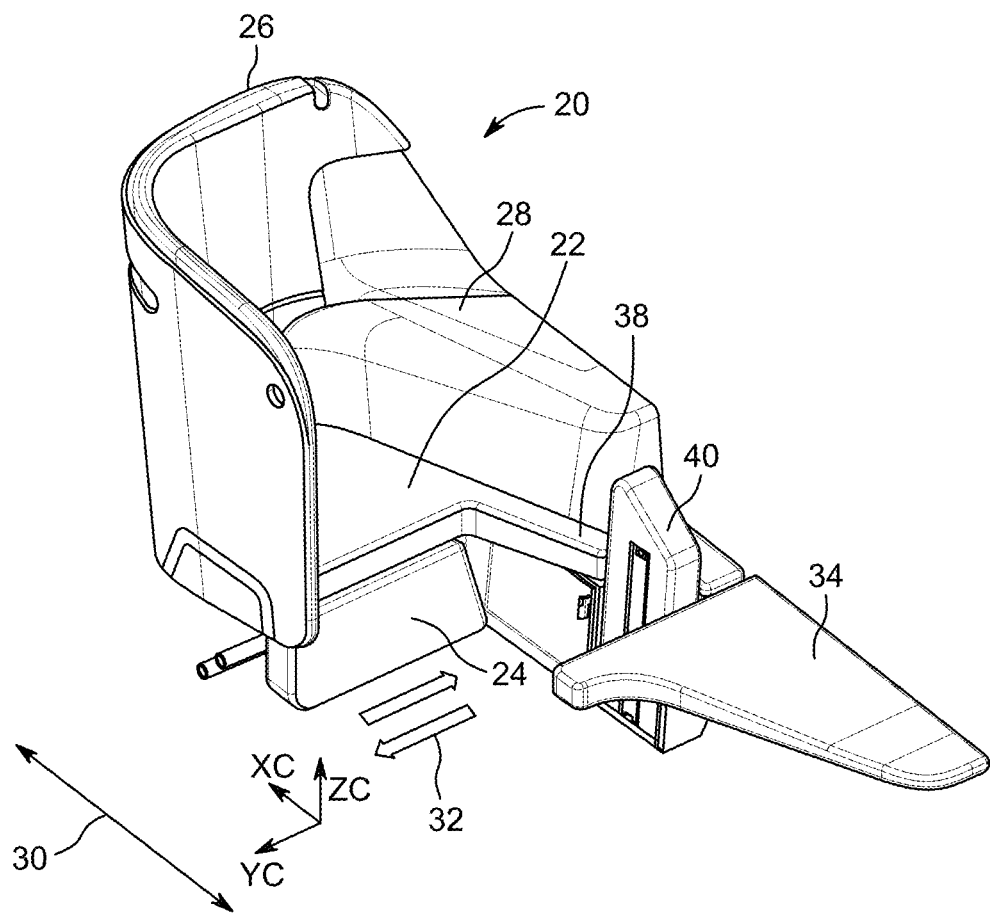
FIG. 1 is a perspective view of a non-limiting example of a passenger seat construction including an ottoman and a deployable bed infill assembly according to an embodiment of the inventive aspects.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

With reference to the drawing figures, disclosed herein are inventive aspects of deployable infill assemblies, such as furniture pieces, for use with various passenger seat constructions. The assemblies may be separate from or an integrated part of the passenger seat construction. The assemblies generally include a deployable cushion assembly configured to stow between uses outside of the passenger seat ingress and egress path and deploy laterally for use into the seat ingress and egress path. The cushion assembly is selectively deployable as needed to expand the seat length in lounge or bed mode, for example, to support the legs or complete a bed.

For example, a passenger seat construction may include a seat back, seat bottom and leg rest that adjust to reconfigure the seat in an upright sitting position for taxi, take-off and landing (TTOL) and a reclined sitting position during flight, with various achievable intermediate sitting positions therebetween. In some seat constructions, the seat may recline fully to form a bed in which the surfaces of the seat back, seat bottom and leg rest are horizontally aligned. In such a seat construction, the cushion assembly may deploy perpendicular to the direction of seat recline (e.g., longitudinal seat axis) such that the deployed cushion assembly meets the forwardmost edge of the horizontal leg rest to expand the longitudinal length of the relined seat or bed. In seat constructions lacking a leg rest, the cushion assembly may deploy to meet the forwardmost edge of the seat bottom to expand the longitudinal seat length. In yet other seat constructions, an ottoman may be positioned space forward apart from the seat, and the cushion assembly may deploy to meet the facing edges of both the leg rest (or seat bottom) and the ottoman to provide a continuous seat or bed from the seat back thru the ottoman.

Benefits of the infill assembly include, but are not limited to, expanded bed lengths, larger living spaces, allowing the use of fixed ottomans, shorter required seat element translation distances, and less complex seat recline mechanisms. Particular advantages of the infill assemblies disclosed herein include, but are not limited to, a minimal volume of free space required to allow the transition from stowed to deployed, the simplicity of the assembly by employing a single support on one end and guides defining the trajectory on the other end, a spring loaded lever that pushes out the lower portion of the cushion assembly when stowed, and a predetermined curvature that the guides travel to allow a user to deploy the cushion assembly without mechanical assistance. The deployable infill assembly further allows for seat constructions not previously achievable without such an assembly. Uses of the infill assembly include a bed extension, separate ottoman, meal table, etc.

FIG. 1 illustrates an exemplary passenger seat construction shown generally at reference numeral 20. The passenger seat construction 20 generally includes seat elements such as a seat bottom 22, a leg rest 24, and a seat back (not shown). At least one of the seat elements are adjustable such that the seat can be in an upright sitting position for TTOL and a reclined position during flight. The reclined position can be any position between the upright sitting position and a bed. For example, the reclined position can include a lounge sitting position in which the seat back is upright and the leg rest is horizontal.

The passenger living space may be at least partially defined by a partition wall 26. As shown, the partition wall 26 extends from aft the of the seat and along one side of the seat adjacent the aisle. The partition wall 26 transitions into a console 28 on the seat side opposite the aisle. Other partition wall configurations are envisioned for defining the living space and enhancing or relaxing privacy. The aisle, indicated at reference numeral 30, may be a longitudinal aisle parallel to the aircraft longitudinal axis. Seat ingress and egress from the aisle 30 is through the path 32 directly forward of the seat bottom 22 that provides passenger leg room in the upright sitting position. The leg rest 24 may stow vertically against the front of the seat when the seat is fully upright, thus leaving open the legroom space and path 32.

An ottoman 34 is positioned forward and spaced apart from the front of the seat. The ottoman 34 spacing is such that the leg rest 24, or the seat bottom 22 when no leg rest is included in the seat construction, is spaced apart from the ottoman when the seat is fully reclined. The spacing of the ottoman 34 and the seat bottom 22 or leg rest 24 provides a gap between the two, and thus a discontinuous bed when the seat is fully reclined. The seat bottom 22 and ottoman 34 may connect through an intermediate connecting portion 38 providing in a peninsula-shaped seat construction. A deployable infill assembly 40 is positioned between the ottoman 34 and the seat, and more particularly, between the ottoman 34 and the connecting portion 38. In some embodiments, a portion of the deployable infill assembly 40 may be part of the connecting portion 38.

Figure 2:
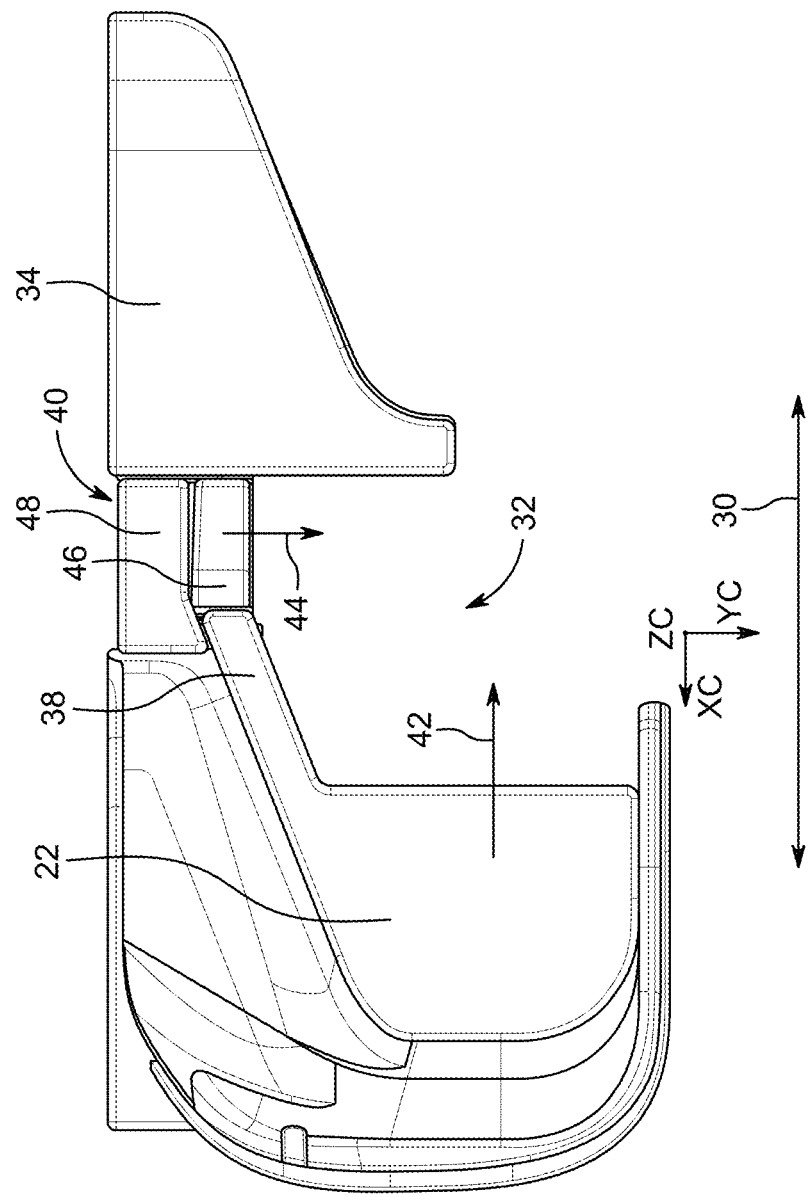
FIG. 2 is a top plan view of the seat construction of FIG. 1 showing the bed infill assembly in a stowed position.

FIG. 2 is an overhead view of the seat construction 20. Directional arrow 42 indicates the seat recline direction and directional arrow 44 indicates the deployment direction of a cushion assembly 46. The seat recline direction is parallel to the longitudinal seat axis and the cushion assembly deployment direction is perpendicular to the seat recline direction. This arrangement allows the cushion assembly to deploy laterally in a minimum footprint needed for the transition, allows the seat to recline freely without interference from the ottoman 34 or the infill assembly 40, allows the infill assembly 40 to be positioned out of the path 32, and allows the cushion assembly 46 to stow outside of the path 32. The arrangement of the elements also allows the use of the ottoman 34 when the cushion assembly 46 is stowed or deployed. The infill assembly 40 further includes a separate cushion 48 affixed atop the assembly separate from the deployable cushion assembly 46, which forms part of the connecting portion 38 between the seat bottom 22 and the ottoman 34.

Figure 3A:
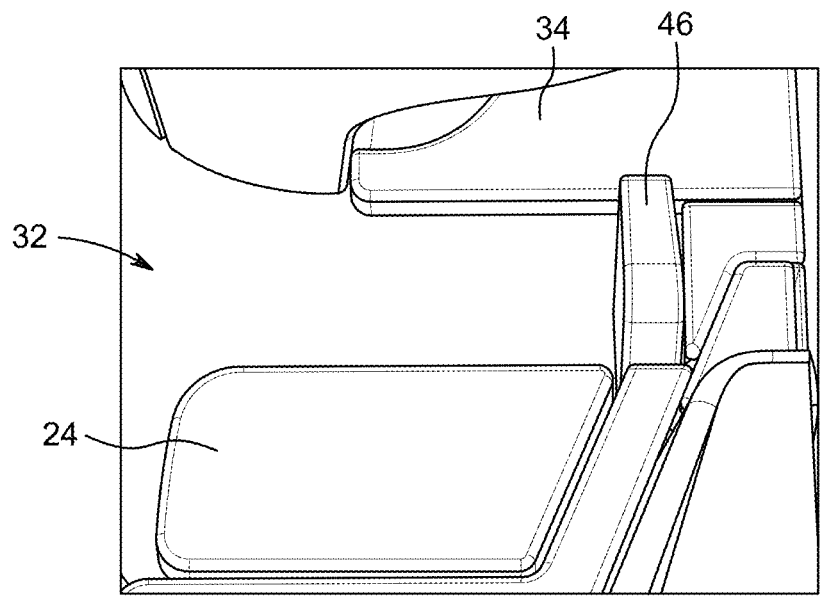
FIG. 3A is a fragmentary top perspective view of the seat construction of FIG. 2 showing the bed infill assembly in a stowed position.
Figure 3B:
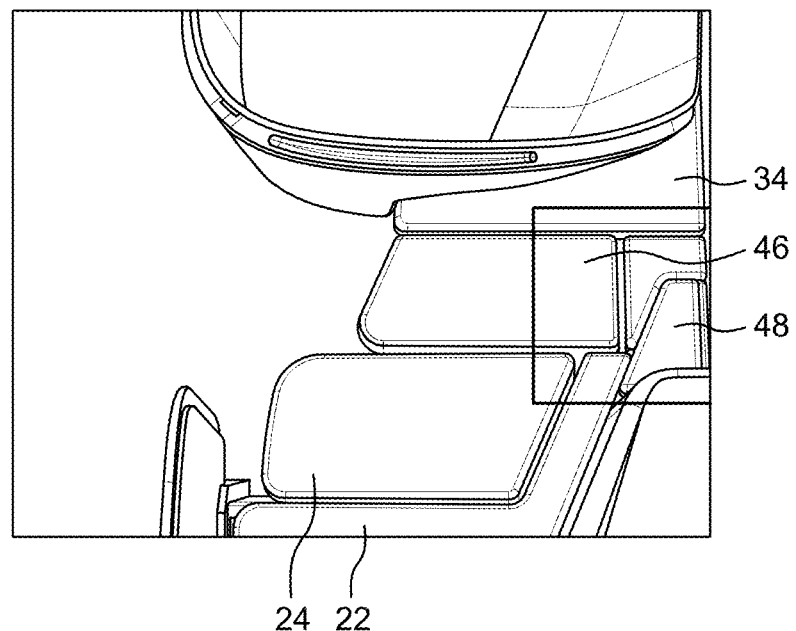
FIG. 3B is a fragmentary top perspective view of the seat construction of FIG. 2 showing the bed infill assembly in a deployed position.

FIG. 3A is a detailed view showing the cushion assembly 46 fully stowed with a gap between the leg rest 24 and the ottoman 34, and thus a clear ingress/egress path 32. The cushion assembly 46 when fully stowed is vertical or near vertical. FIG. 3B is a detailed view showing the cushion assembly 46 fully deployed filling the gap between the leg rest 24 and the ottoman 34 to provide a continuous seat surface or bed. The bed may be completed by the horizontally-aligned elements including the seat back, seat bottom 22, leg rest 24, cushion assembly 46, separate cushion 48, and ottoman 34. The width of the cushion assembly 46 may correspond to the distance between the nearest facing edge of the ottoman and nearest facing end of the closest seat element (e.g., leg rest) when fully reclined. The length of the cushion assembly 46 can be customized. As shown, the cushion assembly 46 has a length to extend from the separate cushion 48 to a point short of the lateral extent of the leg rest 22 nearest the aisle. This predetermined length substantially fills the space between the adjusted leg rest 22 and the ottoman 34, while leaving open a small portion of the ingress/egress path 32 adjacent the aisle.

Figure 4A:
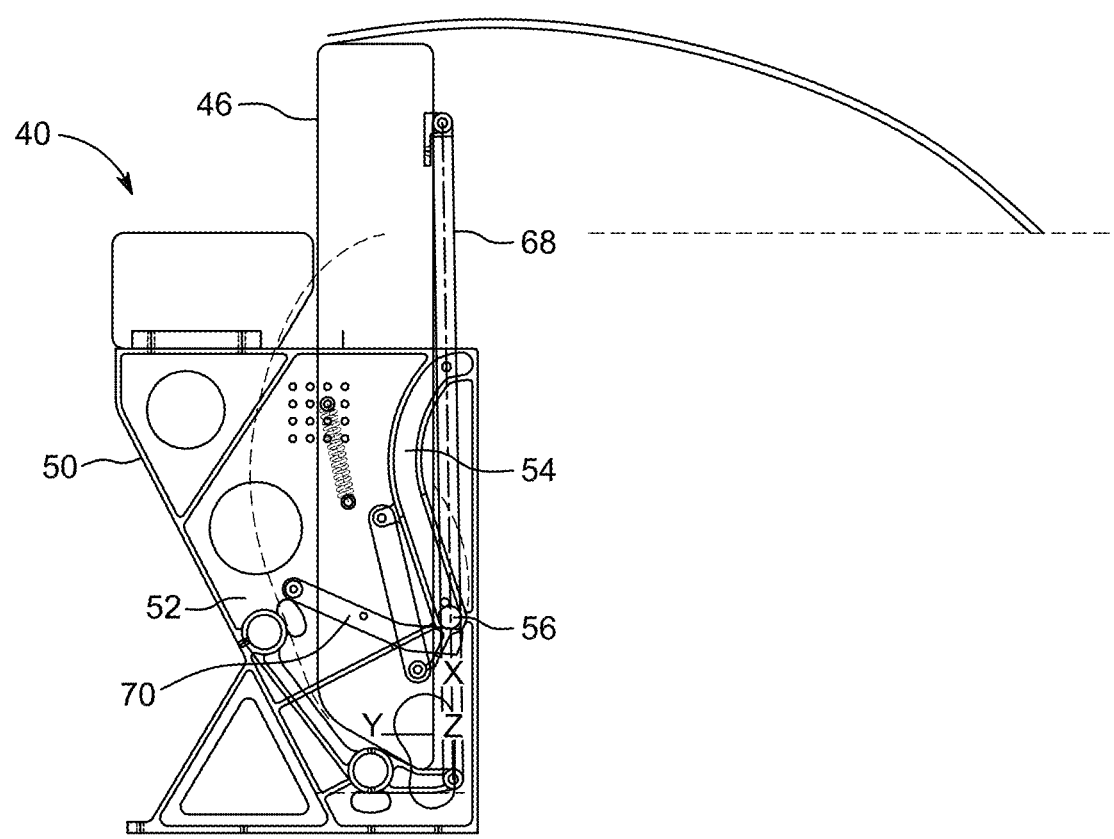
FIG. 4A is a side view of the deployable bed infill assembly showing the cushion assembly in the stowed position.
Figure 4B:
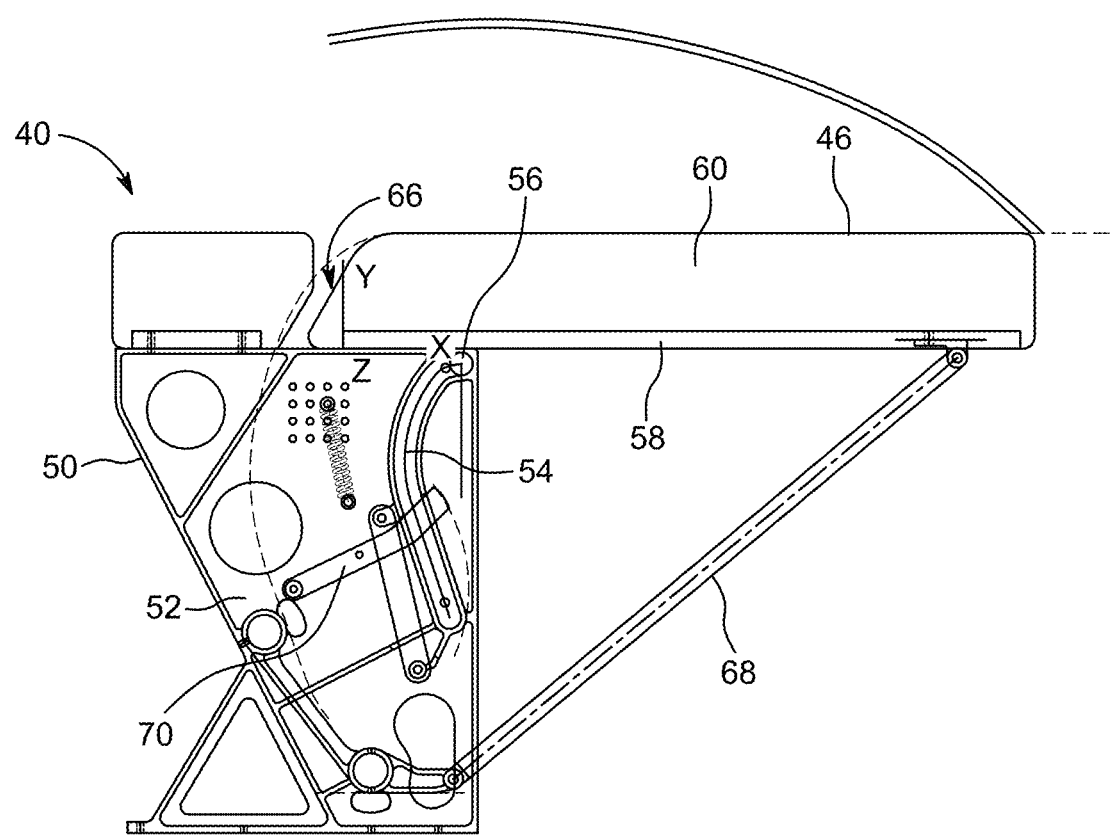
FIG. 4B is a side view of the deployable bed infill assembly showing the cushion assembly in the deployed position.

FIGS. 4A and 4B show an embodiment of the deployable infill assembly 40. The infill assembly generally includes the cushion assembly 46 movably coupled to a frame 50. The frame 50 may be affixed to the seat construction or to the floor. The frame 50 is static and the cushion assembly 46 moves relative to the static frame 50 to transition the cushion assembly between the fully stowed position shown in FIG. 4A and the fully deployed position shown in FIG. 4B. The cushion assembly 46 is vertical or substantially vertical when fully stowed, and horizontal or substantially horizontal when fully deployed. In some embodiments it is possible to lock the cushion assembly 46 in at least one intermediate position between fully stowed and fully deployed.

The frame 50 includes spaced frame members 52 (see also FIG. 5A) and guide tracks 54. The cushion assembly 46 carries at least one guide 56 engaged to travel along the guide tracks 54 to transition the cushion assembly between the stowed and deployed positions. The guide tracks may be symmetrically arranged on the spaced frame members 52 to stably support the movement of the cushion assembly and maintain squareness. The cushion assembly 46 generally includes a base 58. A covered cushion 60 is affixed to one side of the base 58 and the at least one guide 56 is positioned on the opposing side of the base inward of an end of the base.

Moving the cushion assembly, which may be manual or actuated, causes the at least one guide 56 to follow along the guide tracks 54. The length and shape of the guide tracks 56 dictates the deployment and stowage movement of the cushion assembly 46. As shown, each guide track includes a linear portion 62 and an arcuate portion 64, wherein the linear portions 62 guide linear movement of the cushion assembly 46 during initial movement of the cushion assembly away from the fully stowed position and the arcuate portions 64 guide rotational movement of the cushion assembly 46 as the cushion assembly nears the fully deployed position, to provide a low deployment trajectory. The movement of the cushion assembly 46 during deployment and stowage includes both translational and rotational aspects such that the cushion assembly stows between the spaced frame members 52 and deploys along a low deployment trajectory to a cantilevered position resting atop the frame 50. As best shown in FIG. 4B, the facing edges of the cushion assembly 46 and the separate cushion 48 may have opposite chamfers 66 for clearance as the cushion assembly transitions.

The infill assembly 40 further includes a support element 68 coupled between the frame 50 and the cushion assembly 46. The support element 68 moves with the cushion assembly 46 as the cushion assembly transitions between the stowed and deployed positions. In some embodiments, the support element 68 is pivotally attached at one end to the frame 50 and at an opposing end to the cushion assembly 46. The support element 68 stows vertically against the bottom of the cushion assembly 46 in the stowed position and deploys to diagonal to provide support to the overhanging end of the cantilevered cushion assembly.

In some embodiments, the infill assembly 40 further includes a spring-loaded lever 70 pivotally attached at one end to the frame 50. The lever 70 has a free end that intersects one of the guide tracks 54 to contact the at least one guide 56 at a predetermined position along a length of the respective one of the guide tracks to slow movement of the cushion assembly 46 toward the stowed position. The spring-loaded lever 70 further provides an initial lifting force that acts on the cushion assembly 46 during initial movement of the cushion assembly away from the stowed position, to help lift the cushion assembly.

Figure 5A:
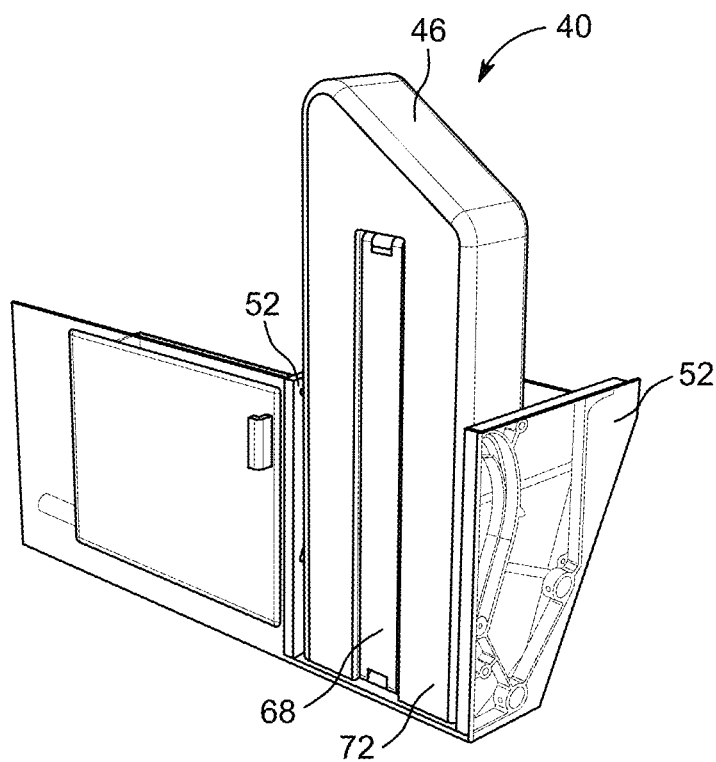
FIG. 5A is a perspective view of the deployable bed infill assembly showing the cushion assembly fully stowed.
Figure 5B:
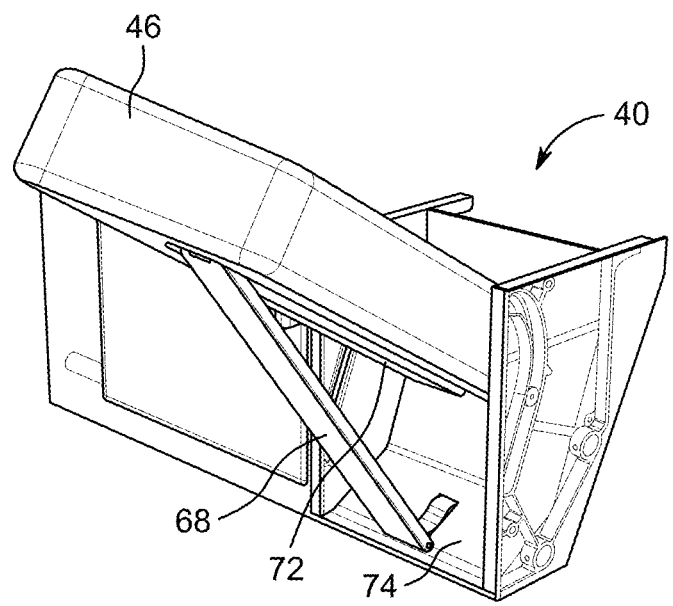
FIG. 5B is a perspective view of the deployable bed infill assembly showing the cushion assembly partially deployed.
Figure 5C:
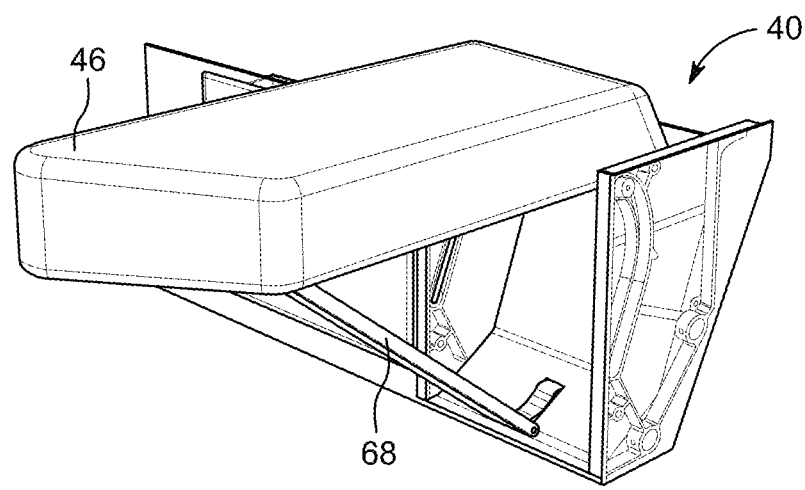
FIG. 5C is a perspective view of the deployable bed infill assembly showing the cushion assembly fully deployed.

FIGS. 5A-5C show another embodiment of the infill assembly 40 further including a recess 72 in the bottom of the cushion assembly 46 that receives the support element 68 therein when the cushion assembly is fully stowed. This construction allows the support element 68 to stow entirely within the bottom of the cushion to provide a more compact package and position the support element further out of the ingress/egress path. FIG. 5A further shows the stowed cushion assembly 46 between the spaced frame elements 52. FIG. 5B shows the cushion assembly 46 partially deployed and with the support element 68 pivotally attached at one end to a transverse frame member 74 and the opposing end of the support element pivotally attached within one end of the recess 72. FIG. 5C shows the cushion assembly 46 fully deployed to extend into the ingress/egress path.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A deployable infill assembly, comprising:
a frame including guide tracks;
a cushion assembly coupled to the frame movable between a stowed position and a deployed position;
at least one guide coupled to the cushion assembly engaged to travel within the guide tracks; and
a support element coupled between the frame and the cushion assembly, the support element movable with the cushion assembly as the cushion assembly transitions between the stowed and deployed positions;
wherein the guide tracks each include a linear portion and an arcuate portion, the linear portion guiding linear movement of the cushion assembly during initial movement of the cushion assembly away from the stowed position, and the arcuate portion guiding rotational movement of the cushion assembly as the cushion assembly nears the deployed position.

2. The deployable infill assembly of claim 1, wherein the stowed position corresponds to a vertical orientation of the cushion assembly within the frame, and the deployed position corresponds to a horizontal orientation of the cushion assembly cantilevered relative to the frame.

3. The deployable infill assembly of claim 1, wherein the at least one guide is positioned on a bottom of the cushion assembly inward of an end of the cushion assembly nearest the frame when the cushion assembly is in the deployed position.

4. The deployable infill assembly of claim 1, wherein the support element is pivotally attached to each of the cushion assembly and the frame, and wherein the support element is diagonally-oriented to support the cantilevered cushion assembly in the deployed position.

5. The deployable infill assembly of claim 1, wherein the cushion assembly includes a recessed bottom portion receiving the support element therein when the cushion assembly is in the stowed position.

6. The deployable infill assembly of claim 1, wherein the cushion assembly is disposed between spaced frame members when in the stowed position, and wherein the cushion assembly is positioned above the spaced frame members when in the deployed position.

7. The deployable infill assembly of claim 1, further comprising a cushion affixed atop the frame separate from the cushion assembly, and wherein the cushion and the cushion assembly reside in a same horizontal plane when the cushion assembly is in the deployed position.

8. The deployable infill assembly of claim 1, further comprising a spring-loaded lever pivotally attached at one end to the frame, the spring-loaded lever having a free end intersecting one of the guide tracks to contact the at least one guide at a predetermined position along a length of the respective one of the guide tracks to slow movement of the cushion assembly as the guide moves toward the stowed position, and the spring-loaded lever providing an initial lifting force acting on the at least one guide during initial movement of the cushion assembly away from the stowed position.

9. A passenger seat construction, comprising:
a seat element;
an ottoman positioned spaced-apart from the seat element; and
a deployable infill assembly, comprising:
a frame including spaced frame members and guide tracks;
a cushion assembly movably coupled to the frame;
at least one guide carried on the cushion assembly engaged within the guide tracks;
a support element coupled between the frame and the cushion assembly; and
a cushion affixed atop the frame separate from the cushion assembly;

wherein the cushion assembly transitions relative to the frame between a stowed position and a deployed position;

wherein the cushion assembly deploys laterally between the seat element and the ottoman;

wherein the cushion and the cushion assembly reside in a same horizontal plane when the cushion assembly is in the deployed position; and wherein the cushion assembly includes a recessed bottom portion receiving the support element therein when the cushion assembly is in the stowed position.

10. The passenger seat construction of claim 9, wherein the stowed position corresponds to a vertical orientation of the cushion assembly within the frame, and the deployed position corresponds to a horizontal orientation of the cushion assembly cantilevered relative to the frame.

11. The passenger seat construction of claim 9, wherein the seat element is a leg rest or a seat bottom, and wherein the seat element is movable between a first position corresponding to an upright sitting position of the passenger seat, and a second position corresponding to a lounge or bed configuration of the passenger seat.

12. The passenger seat construction of claim 9, wherein the guide tracks each include a linear portion and an arcuate portion, the linear portion guiding linear movement of the cushion assembly during initial movement of the cushion assembly away from the stowed position, and the arcuate portion guiding rotational movement of the cushion assembly as the cushion assembly nears the deployed position.

13. The passenger seat construction of claim 9, further comprising a spring-loaded lever pivotally attached at one end to the frame, the spring-loaded lever having a free end intersecting one of the guide tracks to contact the at least one guide at a predetermined position along a length of the respective one of the guide tracks to slow movement of the cushion assembly as the guide moves toward the stowed position, and the spring-loaded lever providing an initial lifting force acting on the at least one guide during initial movement of the cushion assembly away from the stowed position.

14. A premium class passenger seat construction, comprising:

a peninsula-shaped seat surface including a seat element, an ottoman, and a connecting portion, wherein at least part of the connecting portion is an infill assembly comprising a cushion assembly configured to transition between a stowed position and a deployed position, wherein the stowed position corresponds to a vertical orientation of the cushion assembly and the deployed position corresponds to a horizontal orientation of the cushion assembly;

wherein the infill assembly comprises:

a static frame including spaced frame elements and guide tracks;

at least one guide coupled to the cushion element and engaged in the guide tracks;

a support element pivotally attached between the cushion element and the static frame, the support element configured to move with the cushion assembly as the cushion assembly transitions between the stowed and deployed positions; and a spring-loaded lever pivotally attached to one end to the frame, the spring-loaded lever having a free end intersecting one of the guide tracks to contact the at least one guide at a predetermined position along a length of the respective one of the guide tracks to slow movement of the cushion assembly as the guide moves toward the stowed position, and the spring-loaded lever providing an initial lifting force acting on the at least one guide during initial movement of the cushion assembly away from the stowed position.

15. The passenger seat construction of claim 14, wherein the cushion assembly includes a recessed bottom portion receiving the support element therein when the cushion assembly is in the stowed position.

16. The passenger seat construction of claim 14, wherein the seat element is a leg rest or a seat bottom, and wherein the seat element is movable between a first position corresponding to an upright sitting position of the passenger seat and a second position corresponding to a lounge or bed configuration of the passenger seat.

* * * * *